United States Patent [19]

Gainer et al.

[11] Patent Number: 5,566,329

[45] Date of Patent: Oct. 15, 1996

[54] SYSTEM AND METHOD FOR MUTATION OF SELECTED ASSIGNMENT OPERATIONS ON LARGE DATA OBJECTS

[75] Inventors: Patrick J. Gainer, San Jose; Peter P. Gassner, Castro Valley; Tobin J. Lehman, Los Gatos, all of Calif.

[73] Assignee: International Business Machines Corporation, Armonk, N.Y.

[21] Appl. No.: 387,048

[22] Filed: Feb. 10, 1995

[51] Int. Cl.$^6$ .................................................. G06F 17/30
[52] U.S. Cl. .................................... 395/600; 364/DIG. 1; 364/282.1; 364/283.4; 395/200.02
[58] Field of Search ................................... 395/600, 700, 395/650

[56] References Cited

PUBLICATIONS

T. J. Lehman et al., "The Starburst Long Field Manager", Proceedings of the 15th Int'l Con'f on Very Large Databases, IEEE, 1989, pp. 375–383.

R. L. Haskin et al., "On Extending the Function of a Relational Database System," Proc. 1982 ACM–SIGMOD Conference on Management of Data, Jun. 1982, pp. 207–213.

M. J. Carey et al., "Object and File Management in the Exodus Extensible Database System," Proceedings of the 12th Int'l Conference on Very Large Data Bases, 1986, pp. 91–100.

A. Biliris, "An Efficient Database Storage Structure for Large Dynamic Objects," 1992 8th Int'l Conference on Data Engineering, pp. 301–308.

B. Hwang et al., "Efficient Storage Management for Large Objects," 1994 20th Conference on System Architecture and Design (Euromicro '94), pp. 37–44.

Michael Stonebraker, "Large Object Support in Postgres," 9th Int'l Conference on Data Engineering, 1993 IEEE, pp. 355–362.

J. R. Barnett et al., "A Uniform Mechanism to Support Long Fields and Nested Relations in Database Management Systems," 1989 Annual Hawaii Int'l Conference on System Sciences (vol. II), pp. 569–576.

*Primary Examiner*—Paul V. Kulik
*Attorney, Agent, or Firm*—Baker, Maxham, Jester & Meador

[57] ABSTRACT

A relational data base management system that stores and retrieves large data objects (LOBs) from data base storage to evaluate assignment statements includes a data manager that mutates selected string operations into equivalent functions on a LOB operand that can be left in the data base, thereby eliminating the associated storage access operations. When the data manager receives an assignment statement containing one or more LOBs, the data manager first checks to determine if the statement can be mutated. If the statement can be mutated, then the mutation is performed. The mutated statement is then processed according to a conventional deleted evaluation scheme. If the assignment statement cannot be mutated, then the statement is evaluated according to a conventional deleted evaluation scheme. In this way, the data base management system does not require the LOB to be read from the data base into intermediate storage, but instead provides an equivalent result by operating on the LOB in place in the data base storage. This permits processing selected LOB assignment statements with much fewer storage access operations than an immediate evaluation scheme, thereby increasing efficiency and execution speed.

31 Claims, 11 Drawing Sheets

SYSTEM AND METHOD FOR MUTATION OF SELECTED ASSIGNMENT OPERATIONS ON LARGE DATA OBJECTS

BACKGROUND OF THE INVENTION

1. Field of the Invention

This invention relates generally to relational data base systems and, more particularly, to evaluation of assignment statements on large data objects in such systems.

2. Description of the Related Art

Advances in computers and data storage devices have provided users with increasingly faster data access times and with the ability to manipulate increasingly large blocks of information. The storage, retrieval, and manipulation of information is typically accomplished with a data base management system. The information manipulated by users typically comprises data values in the form of numerals and characters. More recently, the manipulated data values have come to include graphic and video forms of data. Graphic and video data are especially prone to including large blocks that must be manipulated.

One type of data base that organizes information for more efficient user manipulation is the relational data base. A relational data base organizes data values into tables with userdefined interrelationships between the tables. A relational data base management system permits users to construct statements that the system will use to extract, insert, and combine data values from the tables. The selected data values can be assigned to new strings, which comprise table entries, or can replace existing strings. For example, users can use a substring operator in an assignment statement to extract a portion of a character string or video image and assign the extracted portion to a new string (or to replace the existing string) for further manipulation. Users can use a concatenate operator to join two separate strings into a single string. Further examples of string operators will occur readily to those skilled in the art.

In addition to being organized into tables of related data values, the data values are stored in a relational data base in accordance with storage units defined by a data device hardware configuration. Typically, a relational data base stores a single data value entirely within a single storage unit called a page. A page usually includes between 512 bytes and 32768 bytes (32×1024 bytes, referred to as 32 kilobytes and abbreviated 32 KB) of data values. Storing data values in pages limits the maximum size of a single data item stored within a page to the size of the page itself. To provide less restrictive limits on the data values stored, some relational data base management systems include a specially-defined data type called a long field or large object, generally referred to as a LOB.

In older data base products, LOBs were limited to a maximum of 32 KB, which some systems were able to store in a single page. More recently, data base products permit LOBs to have size limits on the order of many gigabytes ($10^6$ KB). A data value having a size of several gigabytes potentially could produce significantly slower storage access operations if typical operating techniques are employed. As a result, LOBs are generally managed by a special LOB storage mechanism different from the mechanism used to manage other data types.

Many data base management systems do not support string operations that permit manipulation of LOBs directly, but instead offer only relatively simple store and retrieve access operations, regardless of the actual size of a LOB. That is, once a data base user has defined a data type to be a LOB, potentially having a size of many gigabytes, the operations that can be performed on the LOB will be limited to storing and retrieving the LOB from the relational data base even if the LOB is, in fact, only several kilobytes in size.

Data values of a relational data base typically are stored on one or more data base disk drives. An access operation that retrieves a LOB data value permits the LOB to be read from the disk drives in chunks and placed into either disk files or memory buffers comprising intermediate storage. An intermediate storage disk file is separate from the data base disk drive storage and a memory buffer typically comprises a portion of electronic random access memory (RAM). An access operation that stores a LOB data value permits the LOB to be copied from a disk file or memory buffer and placed into a storage location of the data base. In systems that support only simple store and retrieve operations, any more complicated string manipulation of the LOB data value must be performed on the disk file or memory buffer copy of the data value.

Placing a LOB in a disk file intermediate storage can require potentially many disk drive storage access operations (I/O accesses) that can significantly impede data manipulations and incur a severe performance penalty. The performance penalty exists even if a relatively minor change is made to a LOB. For example, even if just a single byte is appended to a LOB, every byte of the LOB must be read from the data base disk and written before the append operation is complete.

Placing a LOB in a memory buffer intermediate storage is somewhat faster than using disk file intermediate storage, due to much faster access times for RAM as compared with disk drive files. Most computer systems, however, do not have sufficient RAM to contain LOBs of any great size. It is unusual for even relatively large mainframe systems to have more than 256 megabytes (MB) of RAM available. As noted above, modern relational data base management systems can permit LOBs to have a size of many gigabytes (thousands of MB).

Some relational data base management systems support more than relatively simple store and retrieve access operations on LOBs. Such systems have the capability of automatically performing LOB handling and manipulation. For example, some relational data base management systems permit a data base user to interactively enter an assignment statement comprising a sequence of string operators and LOB operands specified by names of data values. The system can automatically retrieve the LOB data values needed for the first specified string operation, perform the string operation, and proceed to retrieve the next group of LOB operands and perform the next specified string operation. As noted above, the LOBs can be extremely large and such processing can become intractable for LOBs beyond several hundred megabytes.

It is known to simplify the handling and manipulation of LOBs in assignment statements using a technique called deferred evaluation that links data structures together. In deferred evaluation, the evaluation of predetermined string operators in an assignment statement is deferred until the entire assignment statement is received, rather than the more typical immediate execution of string operators as they are encountered. Typically, a data structure is created for each operand of an assignment statement. Each data structure includes a specification of what string operations are to be performed. The data base management system analyzes the data structures and the string operations and delays actually retrieving any data values from the data base until string operations have been simplified. That is, intermediate results are not written back to the data base disk if they can be used for the next string operation. In this way, disk access operations are reduced. The following example illustrates the advantages of deferred evaluation.

Consider an assignment statement using the "substring" and "concatenate" string operators and having the following form:

C1=[substring (C1, 1, 50 000 000)] concatenate [C2], which indicates that a substring will be extracted from a LOB called C1, the substring comprising the first 50 million bytes of C1, and that the extracted substring will be concatenated with a LOB called C2. The final, concatenated result will be stored into the data base disk location that originally contained C1. Without deferred evaluation, the relational data base management system would immediately evaluate the assignment statement by first reading the C1 data value from the data base disk into an intermediate storage file or memory buffer. The C1 intermediate copy then would be truncated, leaving only the first 50 million bytes. The truncated C1 copy would be stored back into the data base disk, completing the immediate evaluation of the first operator (the substring operator). The concatenate operation would then be encountered, so the now-truncated C1 data value would be re-read from the data base disk back into a file or memory buffer and the C2 data value would be read into another file or memory buffer. The two data value copies would then be concatenated and the result would be stored back into the data base disk at the C1 data value location.

In the example above, if C1 has an initial size of 100 million bytes and C2 has an initial size of 1000 bytes, then a total of 150,001,000 bytes would be retrieved from the data base disk (original C1, truncated C1, and C2) and a total of 100,001,000 bytes would be stored (truncated C1, and concatenated C1 and C2). Thus, a total of 250,002,000 bytes of storage access operations would be performed using an immediate evaluation scheme.

A relational data base management system using deferred evaluation would evaluate the assignment statement above by receiving the entire assignment statement before performing any evaluation and recognizing that the result of the substring operation is used by the concatenate operation. The system would still perform the substring operation, but the intermediate storing of the substring result and the subsequent retrieval of that result from the data base disk would be avoided, as follows.

In the initial step, the relational data base management system would retrieve only the first 50 million bytes of C1 from the data base disk and store them in a temporary file or memory buffer, producing a truncated copy of C1 in the file or memory buffer. Next, having recognized that the next operation (concatenate) makes use of the intermediate result, the system would avoid storing the truncated C1 back into the data base disk. Instead, the system would leave the truncated C1 in the file or memory buffer and retrieve C2 from the data base disk, storing the C2 copy in another file or memory buffer. The system then would perform the concatenation of the truncated C1 and the C2 copy, storing the result back into the data base disk at the C1 location. In this deferred evaluation example, a total of 50,001,000 bytes would be retrieved and a total of 50,001,000 bytes would be stored. Thus, a total of 100,002,000 bytes of storage access operations would be performed. It should be apparent that storage access operations have been reduced by one-half over the immediate evaluation processing scheme.

Those skilled in the art will appreciate that the linked data structures of the deferred evaluation technique are but one method of simplifying the processing of LOB assignment statements. Other simplification techniques using data lists or arrays will readily occur to those skilled in the art.

Although deferred evaluation provides significant processing time savings and reduced disk access operations over immediate evaluation, analysis of the operations in the example above shows that further time savings and reductions in disk access operations are possible. It would be advantageous if the relational data base management system could recognize, for example, that the first 50 million bytes of the substring and concatenate operations can be written back into the data base disk in the same locations from which they were retrieved and that operating efficiency could be improved if the amount of retrieval and subsequent restorage were reduced. In the substring/concatenation example above, if the C1 substring were not moved back and forth from intermediate file or buffer memory storage to the data base disk at all, then the reduction in disk access operations over the immediate evaluation scheme would be from 250,002,000 bytes to 2000 bytes, a reduction on the order of 50,000 times.

From the discussion above, it should be apparent that there is a need for a relational data base management system that permits reduced disk access operations in evaluating assignment statements by recognizing opportunities for efficiency beyond those afforded by conventional deferred evaluation techniques. The present invention satisfies this need.

SUMMARY OF THE INVENTION

In accordance with the invention, a relational data base management system that stores and retrieves large data objects (LOBs) from data base storage includes a data manager that mutates selected string operations on LOBs into equivalent functions requiring reduced storage access operations. When the data manager receives an assignment statement containing one or more LOBs, the data manager first checks to determine if the statement can be mutated. If the statement can be mutated, then the mutation is performed. The data manager recognizes that a mutatable assignment statement is an assignment statement having at least one string operator and operands such that the string operator can be changed, or mutated, into an equivalent function on a LOB operand that can be left in the data base, thereby eliminating the associated storage access operations. That is, the mutated function does not require the LOB to be read from the data base into intermediate storage, but instead provides an equivalent string result by operating on the LOB in place in the data base storage. The mutated statement is then processed according to a conventional deferred evaluation scheme. If the assignment statement cannot be mutated, then the statement is evaluated according to a conventional deferred evaluation scheme. In this way, the relational data base management system can process selected LOB assignment statements with much fewer storage access operations than an immediate evaluation scheme, thereby increasing efficiency and execution speed.

In one aspect of the invention, operands of an assignment statement being evaluated are represented by a separate data structure called a long string expression (LSE). An LSE data structure is created for each operand encountered in an assignment statement. The string operation mutation checking and the string operator mutation itself are carried out with the LSE data structures, without retrieval of data values from the data base storage. After all string operators that can be mutated have been mutated, the assignment statement is ready for deferred evaluation, at which time the data values are retrieved from the data base storage and a conventional deferred evaluation scheme is performed on the mutated assignment statement. The LSE data structures are then deleted. Using LSE data structures for indirect processing of data further simplifies data base access operations.

In another aspect of the invention, the data manager mutates a LOB assignment statement by determining whether a length altering string operation is being performed on the first operand of a received assignment statement, beginning at the first byte of the first operand. In such a case, the data manager recognizes that the string operation can be equivalently performed by a truncate-in-place operation on the first operand so that a storage access operation is unnecessary. The data manager then continues with mutating the remaining string operators in the assignment statement to replace selected string operators with equivalent functions before evaluating the mutated assignment statement using the deferred evaluation scheme.

Other features and advantages of the present invention should be apparent from the following description of the preferred embodiment, which illustrates, by way of example, the principles of the invention.

DESCRIPTION OF THE PREFERRED EMBODIMENT

Figure 1:
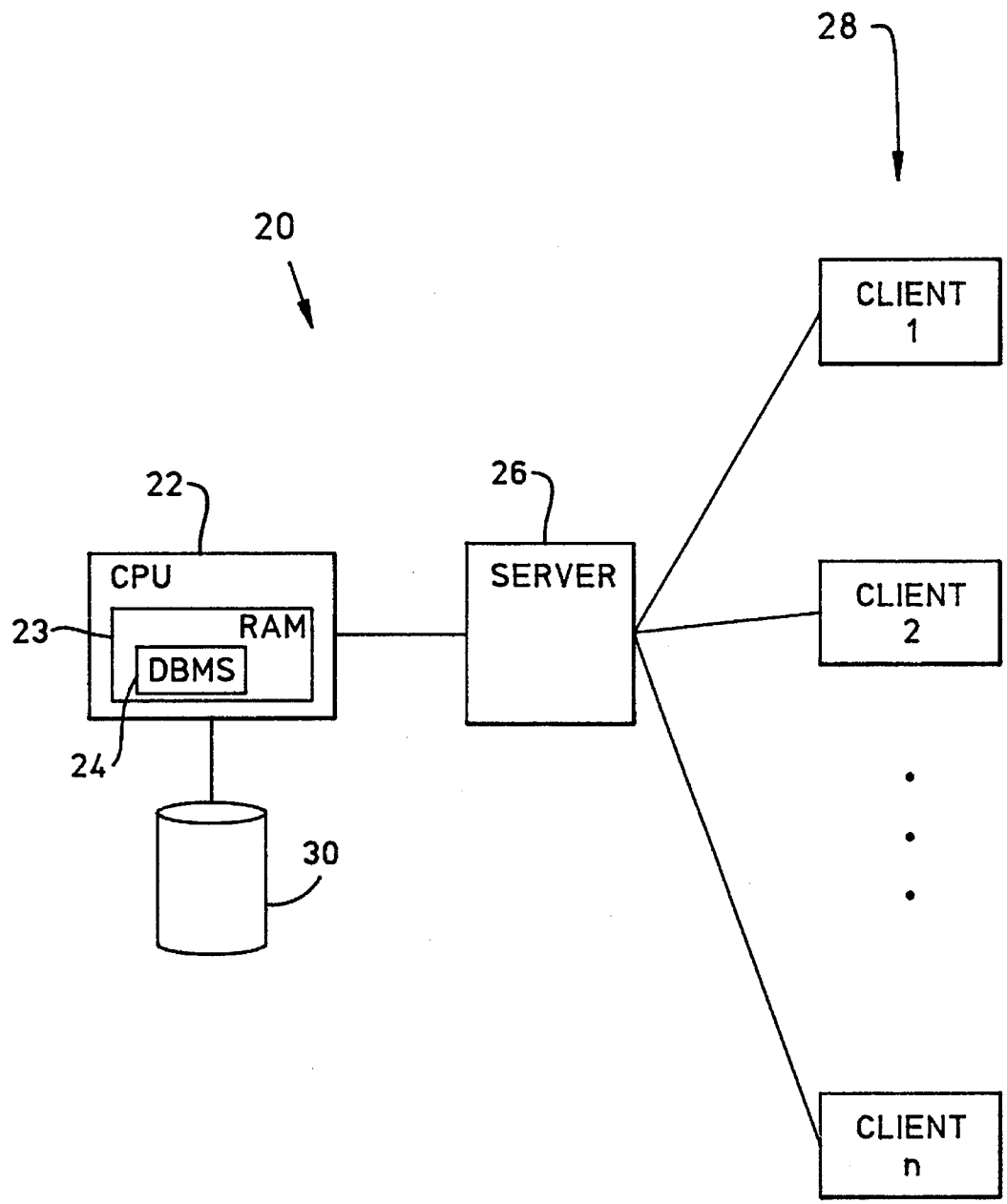
FIG. 1 is a block diagram of a computer system having a relational data base management system constructed in accordance with the present invention.

FIG. 1 illustrates a computer processing network system 20 constructed in accordance with the present invention. The system includes a central processor unit (CPU) 22 having random access memory (RAM) 23 in which is resident a relational data base management system 24 (referred to as the DBMS). The CPU 22 is connected to a file server 26, to which many clients 28 can be connected. In FIG. 1, only three clients are shown, for simplicity of illustration. A storage subsystem 30 that is connected to the CPU 22 provides storage locations where data values comprising a relational data base are kept. The DBMS 24 receives assignment statements from the clients 28 and performs data access operations to retrieve referenced data values from the storage subsystem 30, execute string operations specified in the assignment statements, and return the resulting data values to the storage subsystem. In accordance with the present invention, when the DBMS 24 receives an assignment statement containing one or more data values comprising predefined large data objects (LOBs), the DBMS determines if the statement can be mutated and, if mutation is possible, performs a mutation step that mutates string operators into equivalent functions that reduce the number of access operations otherwise executed and then processes the mutated statement using conventional deferred evaluation techniques. If the statement cannot be mutated, then it is evaluated according to conventional deferred evaluation techniques. In this way, the DBMS 24 processes selected LOB assignment statements with much fewer data access operations, thereby increasing efficiency and speed of statement evaluation.

The CPU 22 can comprise, for example, a large mainframe machine such as the International Business Machines Corporation (IBM) product called "System/390" or can comprise a workstation such as the IBM product called "AS/400" or can comprise an IBM "Personal Computer" processor or compatible machine. The file server 26 and the clients 28 include central processor units, which typically do not have the computational power of the CPU 22. Typically, the file server 26 includes a processor that is at least as powerful computationally as any one of the clients 28. The file server can comprise, for example, a workstation and each of the clients can comprise an "IBM Personal Computer" machine. Alternatively, a user of the DBMS 24 can be connected directly to the CPU, rather than to a client. The storage subsystem 30 can comprise any of a number of conventional direct access storage devices (DASDs) known to those skilled in the art, such as one or more disk drive systems.

Figure 2:
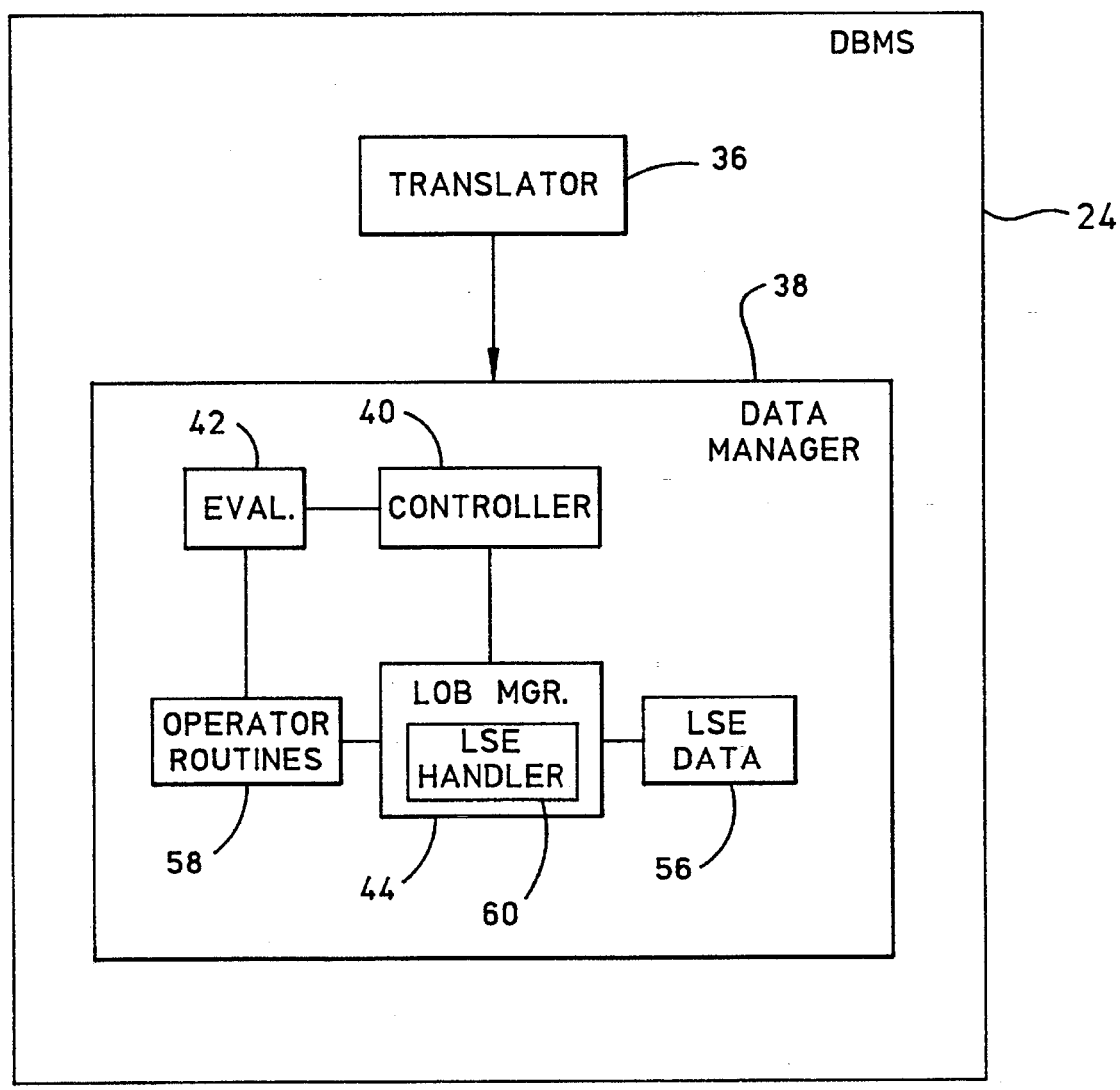
FIG. 2 is a block diagram of the relational data base management system illustrated in FIG. 1.

FIG. 2 illustrates the functional blocks of the DBMS 24. FIG. 2 shows that the DBMS includes two primary functional blocks, a translator 36 and a data manager 38. The translator receives data base requests from the clients 28 (FIG. 1) in the form of assignment statements according to a data base language format and converts them into data structures representations and expressions that are recognizable by the data manager. The data manager then carries out the string operator mutation in accordance with the present invention, as will be described further below, and carries out the appropriate storage and retrieval of data values from the data base storage. The translator operates according to conventional translation schemes according to the data base management system being used. The assignment statements as formulated by the clients, for example, might be in a language format specified by a data base management system software product called "DB2" available from IBM. The translation schemes used by systems such as the DB2 data base management system and the like will be understood by those skilled in the art without further explanation.

The translated assignment statements received by the data manager 38 of the DBMS 24 are of the following form:

<string 1>=<operation> where "<string 1>" refers to the name of a data item from the relational data base in the disk storage subsystem 30 (FIG.

1) and "<operation>" refers to a relational data base reference to at least one string operator and at least one operand. Those skilled in the art will appreciate that string operators include functions such as a substring function (SUBSTR) and a concatenate function (CONCAT) that provide a means of altering respective operand(s), such as a named data item. The DBMS 24 evaluates the assignment statement by performing the indicated operations and then places the result in the data item named by <string 1>. For example, an assignment statement using the concatenate operator might appear as follows:

<string 1>=<string 1>CONCAT<string 2>.

The ultimate result of evaluating this assignment statement will be that the concatenation of <string 1> and <string 2> will be placed in the storage subsystem location where <string 1> formerly was kept.

Figure 3:
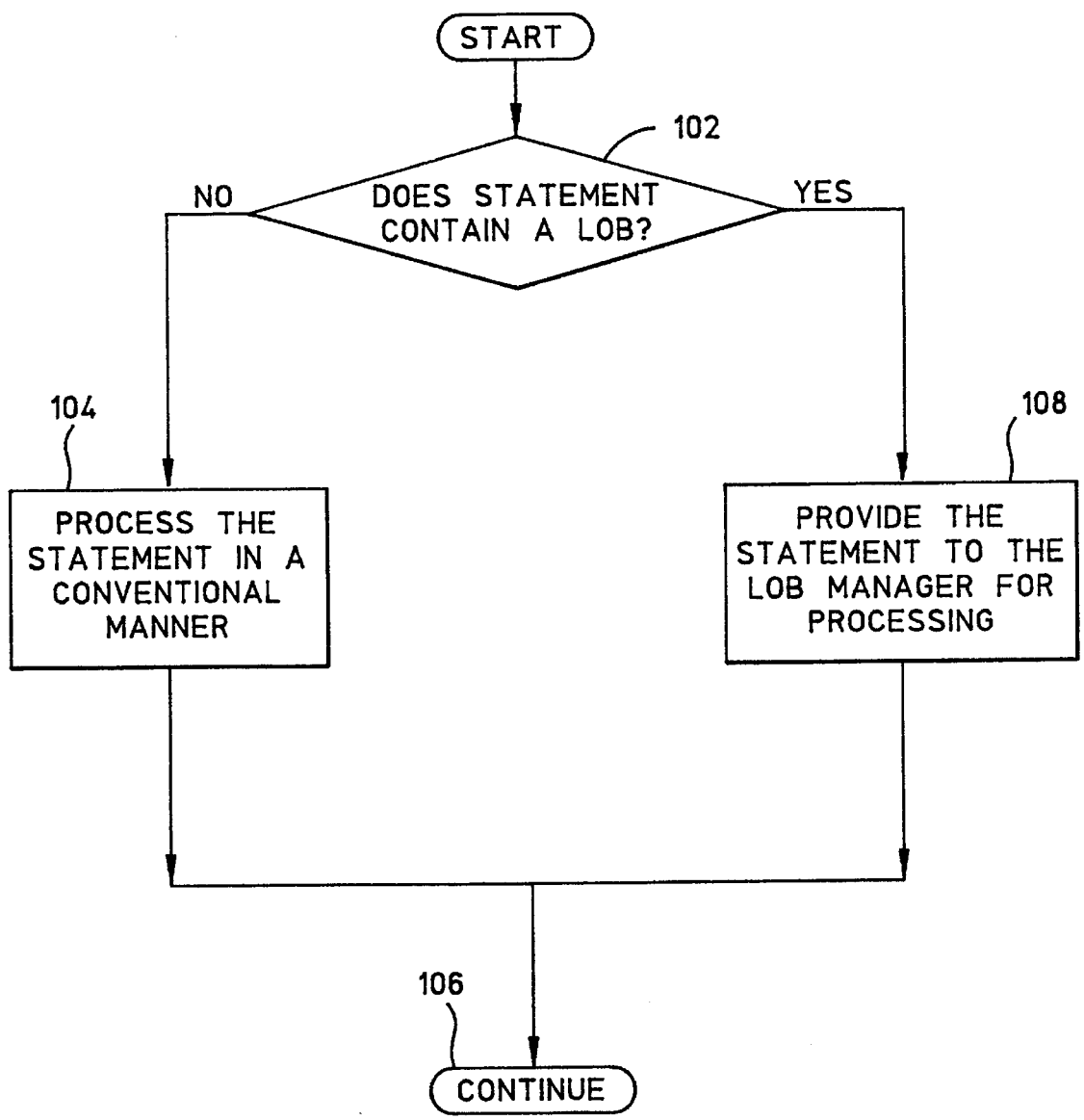
FIG. 3 is a flow diagram that illustrates the processing steps performed by the data manager of the data base management system illustrated in FIG. 2.

Returning to FIG. 2, the translated assignment statements received by the data manager 38 are processed by a data manager controller 40. The processing steps followed by the data manager controller will be better understood with reference to the flow diagram of FIG. 3. The first step performed by the data manager controller is to determine if the assignment statement includes a large data object (LOB). This processing step is indicated by the flow diagram box numbered 102 in FIG. 3. If the assignment statement does not contain a LOB, then the controller 40 passes the translated assignment statement to a statement evaluator block 42, which processes the assignment statement in a conventional manner. This processing step is illustrated in FIG. 3 by the flow diagram box numbered 104. Processing then continues with the next received assignment statement, as indicated in FIG. 3 by the continuation box numbered 106.

If the data manager controller 40 determines that the translated assignment statement includes a LOB, an affirmative outcome at the decision box numbered 102, then the data manager controller passes the assignment statement on to a LOB manager 44 (FIG. 2) for processing in accordance with the invention. This processing step is represented in FIG. 3 by the flow diagram box numbered 108. After the assignment statement is processed by the LOB manager, processing by the controller 40 continues with the next received assignment statement, as indicated by the continuation box numbered 106.

When the LOB manager 44 receives a translated assignment statement containing a LOB, it processes the statement by first creating a data structure for each operand of the statement. The data structures are referred to as long string expressions (LSE). Each LSE data structure contains information about its associated LOB and indicates the order of evaluation for the assignment statement. More particularly, the LSE data structures comprise nodes that represent specific pieces of data with pointers to successive operands of the assignment statement. An LSE data structure is specified by several parameters, as illustrated in FIG. 4.

The first parameter that specifies an LSE data structure is a data type field. The data type field specifies, in the preferred embodiment, a long field descriptor comprising a data base LOB name, or a file, or a memory buffer. Additional data types include integers, floating point numbers, character strings, time data, and date data. With these data types, most large object representations can be supported, including literal strings, variable strings, strings held in buffer memory or file space, strings contained in named files, and strings contained in data base long fields. The LSE data structure also includes a parameter that specifies the type of source from which the actual data value will be obtained. In the preferred embodiment, the source types include a memory buffer, a file name, or a long field descriptor. Other LSE data structure parameters include a pointer or reference address to the source, a starting position in the source, the actual number of bytes in the source data value, the total number of bytes (including any pad bytes) represented by the data structure, and a pointer to the next LSE data structure. Returning to FIG. 2, the LOB manager 44 maintains a collection of the LSE data structures during the evaluation of an assignment statement in an LSE data section 56 of the CPU memory 23.

Figure 4:
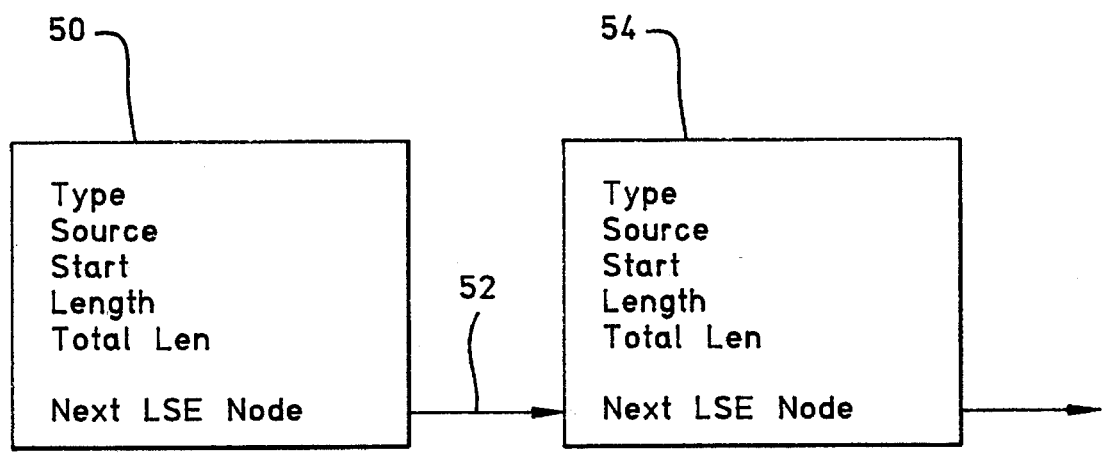
FIG. 4 is a representation of a LSE data structure created by the LOB manager illustrated in FIG. 2.

FIG. 4 is a representation of two LSE data structures, illustrating a two-operand assignment statement in which a first operand data structure 50 includes a pointer 52 to a second operand data structure 54. The pointer in an LSE data structure provides an indication of the type of string operator specified in an assignment statement. That is, a substring operation does not require two operands and therefore the pointer is not set to a next LSE data structure if the assignment statement is simply a substring operator. The concatenate operator, however, requires two operands and therefore the pointer of a first LSE data structure pointer is set to a next LSE data structure if the string operation is a concatenation.

Figure 5:
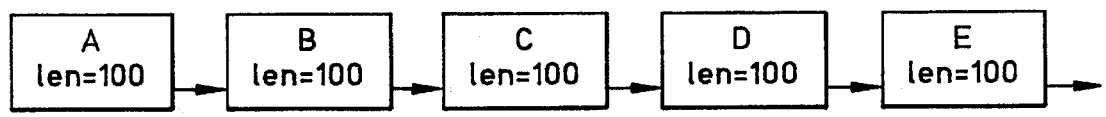
FIG. 5 and FIG. 6 are representations of data structures such as illustrated in FIG. 6 illustrating the performance of a series of concatenation operations on a sequence of LOBs by the LOB manager illustrated in FIG. 2.
Figure 6:
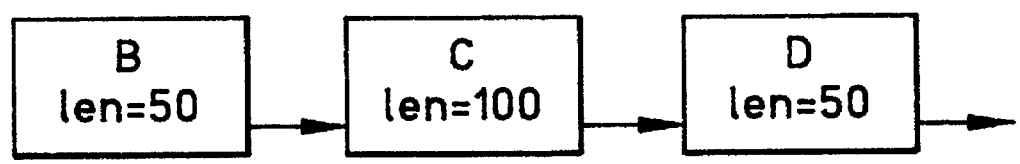

As noted above, the data manager 38 of the preferred embodiment provides more efficient evaluation of assignment statements by implementing both deferred evaluation and string operator mutation in conjunction with LSE data structure representation of assignment o statement operands. FIG. 5 and FIG. 6 illustrate the advantages gained by the deferred evaluation.

FIG. 5 is a representation of an assignment statement comprising a series of concatenations followed by a substring extraction having the form:

X=SUBSTRING((A CONCAT B CONCAT C CONCAT D CONCAT E), 50,200), indicating first a concatenation of data values A, B, C, D, and E (represented in FIG. 5 as blocks) followed by an extraction of a substring beginning at byte location 150 and continuing for a length of two hundred bytes. Using the LSE data structures, the data manager 38 effectively constructs a five-node structure comprising the data structures for A, B, C, D, and E. The notation "len=100" in FIG. 5 indicates that each data value has a length of one hundred bytes. Thus, the net effect of the assignment statement is to extract a 200-byte string comprising the last fifty bytes of B, all of C, and the first fifty bytes of D.

Conventionally, each of the data values would be retrieved from the data base and the concatenation operations would be performed. In contrast, the data manager 38 of the preferred embodiment effectively deletes the nodes A and E of the FIG. 5 representation, because it recognizes that A and E were excluded from the result. The data manager also modifies the start and length values of node B to have a new start value of byte location 50 (corresponding to the byte location in the data base data value, which has not been read from the data base storage) and a new length value of fifty bytes. Similarly, the LSE data structure representing node D is modified to have a new length value of fifty bytes. The resulting LSE data structure representation is illustrated in FIG. 6.

As noted above, both the standard statement evaluator block 42 and the LOB manager 44 evaluate assignment statements by calling a set of data functions to carry out string operations such as substring, concatenation, and the like. These data functions are illustrated in FIG. 2 by the box labelled operator routines 58. In the preferred embodiment, these operator routines include the five functions of insert, append, truncate, delete, and read. The insert function places a data value into file or memory buffer. The append function joins a first data value at its end with a second data value. The truncate function cuts off a data value from a specified byte location. The delete function eliminates a data value from the data base. Finally, the read function retrieves a data value from the data base. Other data base management system implementations might include additional functions that will occur to those skilled in the art, such as a replace or overwrite function, and a prepend function. These additional functions will be known to those skilled in the art without further explanation.

The operator routines 58 permit data base users to carry out sophisticated string operations, including substring and concatenate, without becoming involved in the handling and manipulation of LOBs. Thus, both the statement evaluator 42 and LOB manager 44 will automatically generate the appropriate calls to the operator routines to carry out their respective duties in evaluating assignment statements. The operating steps performed by the LOB manager 44 will be described in greater detail and will be better understood with reference to the flow diagram of FIG. 7.

Figure 7:
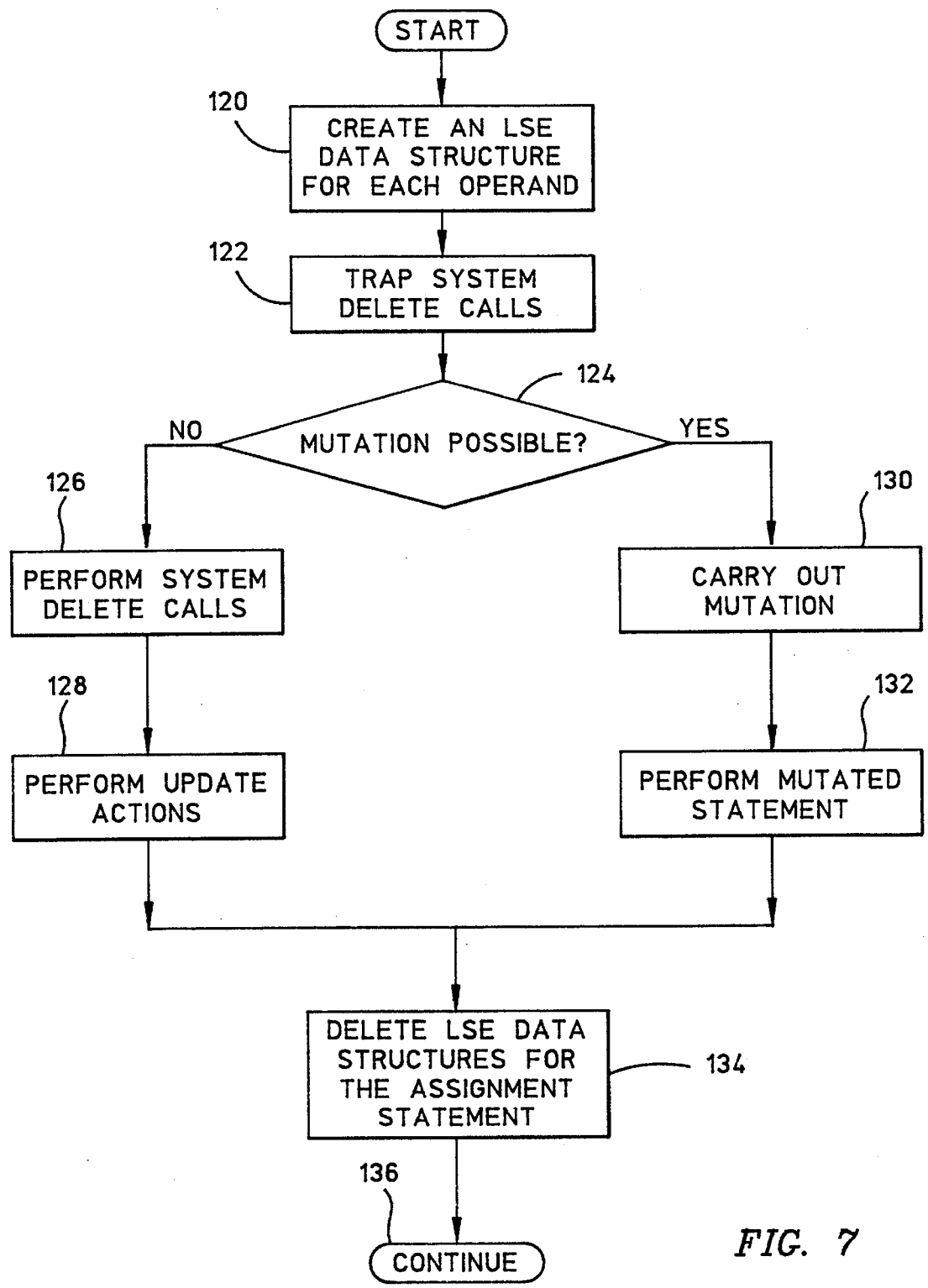
FIG. 7 is a flow diagram that illustrates the processing steps performed by the LOB manager of the data base management system illustrated in FIG. 2.

FIG. 7 is a flow diagram that illustrates the processing steps followed by the LOB manager 44. As noted above, the first step performed by the LOB manager in processing an assignment statement is to create an LSE data structure for each statement operand. This step is represented in FIG. 7 by the flow diagram box numbered 120. The next processing step performed by the LOB manager is to trap all calls to LOB delete routines that are not direct delete functions requested by a client. With respect to the delete routines, as noted above, the DBMS 24 does not require a user to become involved in the handling and manipulation of LOBs and, therefore, the system automatically calls a variety of data operation routines represented in the block diagram of FIG. 2 by the box labelled Operator Routines 58. Thus, a delete routine might be called automatically from the group 58 by the LOB manager 44 in processing an assignment statement and also might be called directly by a client 28 who explicitly specifies a delete operation in an assignment statement. In accordance with the invention, then, only delete calls initiated by the automatic processing of the data base management system are trapped.

Trapping the automatic system calls to delete routines prevents the delete function from immediately being performed. Instead, the LOB manager 44 sets a flag to indicate that a delete call has been requested. The flag preferably is kept in memory 23, along with the LSE data structures. Trapping is necessary for two reasons. First, trapping the delete call confirms that the string operation being processed is in fact an update operation and not just a client-initiated delete or insert operation. Secondly, at the time the automatic delete call is made, the destination of the LOB assignment statement is available as the target of the delete. This destination will be required for later processing, should there be a string operator that can be mutated. The LOB manager processing step of trapping automatic delete calls is represented by the FIG. 7 flow diagram box numbered 122.

The next processing step performed by the LOB manager is to test whether it is possible to mutate the pending string operator of the assignment statement. The LOB manager implements this step by determining whether the first LOB encountered on the right side of the assignment statement (to the right of the equal sign in the assignment statement of the form <string 1>=<operation>) is the same LOB encountered immediately on the left side of the assignment statement. The first LOB on the right side of the assignment statement is referred to as the source and the LOB on the left side of the assignment statement is referred to as the sink.

More particularly, the LOB manager tests for equivalence between the source and the sink by first testing whether the LOBs come from the same data base table. If they come from the same table, then the sizes of the LOBs are compared. If the sizes are equal, then the disk addresses of the starting portions of the LOBs are compared. If the disk addresses are different, then mutation is considered impossible. All information necessary to carry out these processing steps is contained in the LSE data structure initially created by the LOB manager. If mutation is considered not possible, then any delete request initiated by the client or trapped by the prior testing is performed and the default update actions comprising the remainder of the assignment statement are evaluated. If the outcomes of the tests are affirmative, then the LOB manager concludes that operand mutation is possible.

It should be noted that, if the data base management system includes operator routines 58 (FIG. 2) that support a prepend function, then the mutation checking step is not limited to cases where the operand adjacent both sides of the equal sign is the same. That is, the embodiment lacking a prepend function can mutate assignment statements of the form:

<string 1>=<string 1>CONCAT<string 2> but cannot mutate assignment statements of the form

<string 1>=<string 2>CONCAT<string 1>.

As described more fully below, the first form of concatenation statement can be replaced by the illustrated system with an append function call that adds <string 2> onto the end of <string 1>. Those skilled in the art will appreciate that a prepend function would permit a concatenation statement of the second form to be replaced by a mutated statement comprising a prepend function call that places <string 2> at the beginning of <string 1>.

The testing for operand mutation as described above is represented in the FIG. 7 flow diagram by the box numbered 124. If the string operator cannot be mutated, then the assignment statement is evaluated by the conventional evaluator block 42 (FIG. 2). In particular, the step of performing delete calls in the event that mutation is not possible is represented by the flow diagram box numbered 126 and the step of performing the remaining update actions following the delete calls is represented by the flow diagram box numbered 128.

If the LOB manager determines that the string operator can be mutated, then the mutation is carried out (represented by the flow diagram box numbered 130) and then the mutated statement is evaluated (represented by the flow diagram box numbered 132). After the statement has been evaluated, the LSE data structures associated with the assignment statement are deleted, as indicated by the flow diagram box numbered 134. Processing then continues with the next assignment statement, represented by the continuation block numbered 136. It should be noted that the LSE data structures also are deleted by the conventional evaluator block following evaluation of the non-mutatable assignment statement at the flow diagram box numbered 128.

The step of carrying out mutation, represented by the flow diagram box numbered 130 in FIG. 7, is carried out by a LOB manager operating block referred to as an LSE handler 60 (FIG. 2). The processing steps performed by the LSE handler will be better understood with reference to the flow diagram of FIG. 8.

Figure 8:
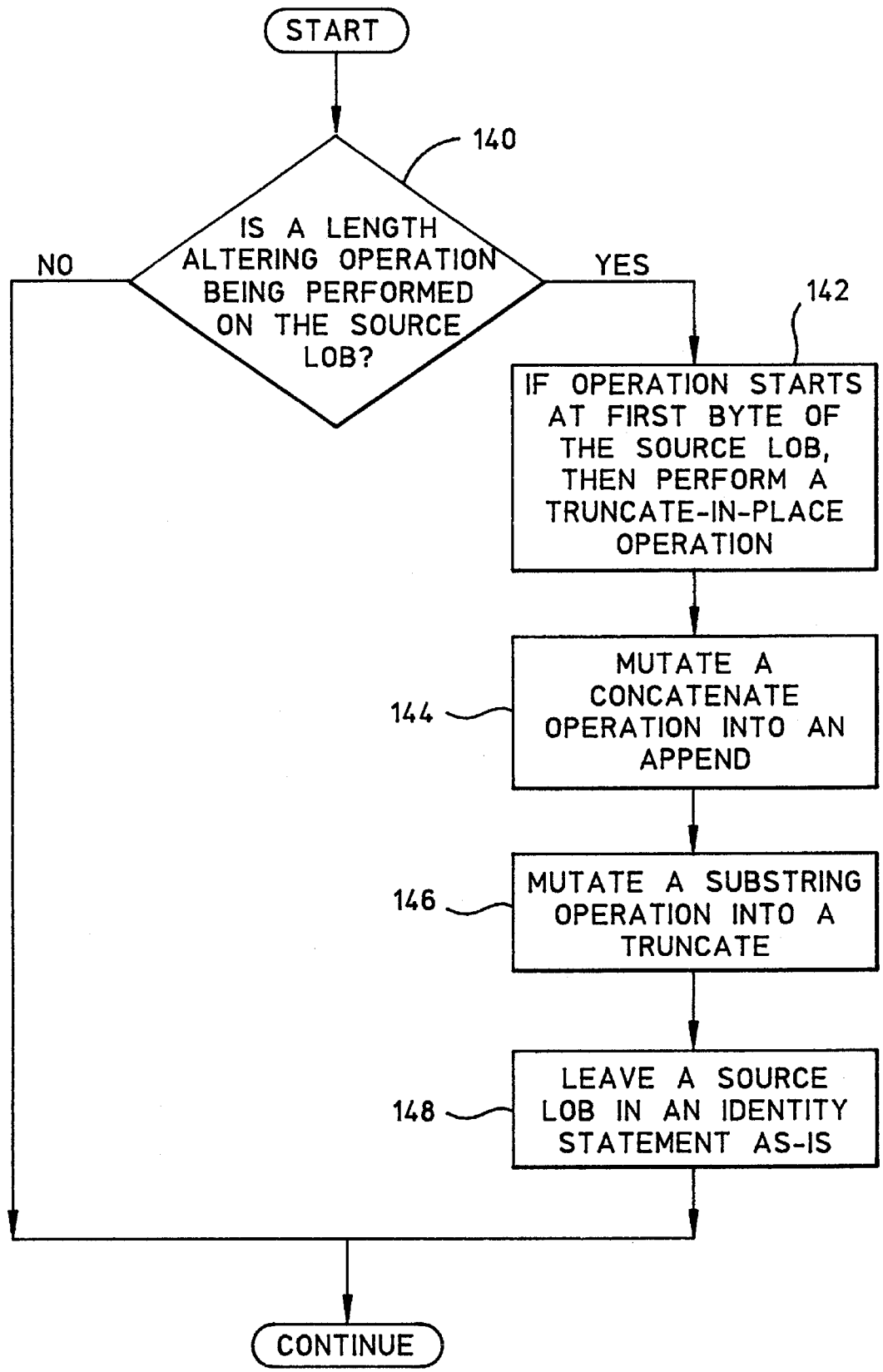
FIG. 8 is a flow diagram that illustrates the processing steps performed by the LOB manager illustrated in FIG. 2 in mutating an expression.

The first step performed by the LSE handler is to determine whether a length altering operation is being performed on the source LOB. This step is represented in FIG. 8 by the decision box numbered 140. If such an operation is being performed, an affirmative outcome at the decision box, then processing proceeds to the step represented by the flow diagram box numbered 142. At box 142, the LSE handler performs a truncate-in-place operation on the source LOB if the length altering operation starts at the first byte of the source LOB. That is, if the first string operation of the assignment statement is a substring operation that begins at the first byte of the source LOB, then the LSE handler performs a truncate-in-place operation without reading the source LOB into an intermediate data storage file or memory buffer. This conditional operation is only necessary because, in the exemplary system described herein, the truncate-in-place operation can only be performed in conjunction with the first byte of a LOB. Those skilled in the art will appreciate that LSE handlers and LOB data structures that are configured differently from what is described in the drawings might not be restricted to first-byte substring operations.

Thus, a substring operation beginning at the first byte of a source is mutated into a truncate-in-place operation. The truncate-in-place operation is an equivalent function to the substring operation but does not require a data access operation. In particular, the truncate-in-place operation as implemented by the LSE handler merely involves updating the LSE data structure. In this way, no LOB data access operation need be performed. This step is represented in FIG. 8 by the flow diagram box numbered 142.

The next processing step is performed by the LSE handler regardless of whether or not the truncate-in-place operation could be carried out in the FIG. 8 flow diagram box numbered 142. The processing step actually comprises one of three possible steps in the preferred embodiment, and effectively implements evaluation of the remaining portion of the assignment statement, as follows.

In the preferred embodiment three basic classes of update statements are mutated by the LSE handler. These three classes include concatenate statements, substring statements, and identity statements. In the first instance, the LSE handler mutates a concatenate statement o into a simple append statement. This processing step is represented in FIG. 8 by the flow diagram box numbered 144. Next, the LSE handler mutates substring statements into simple truncate statements. This processing step is represented in FIG. 8 by the flow diagram box numbered 146. Finally, identity statements (C1=C1) are not mutated into an operation but leave the operand unchanged. This processing step is represented in FIG. 8 by the flow diagram box numbered 148.

The mutation of concatenate, substring, and identity string operators reduces the number of data base storage access operations by reducing the number of evaluator routines otherwise called by the data manager in evaluating an assignment statement. For example, to evaluate an assignment statement of the type:

<string 1>=<string 1>CONCAT<string 2>, a conventional data manager would read <string 1> to a file or memory buffer intermediate storage, read <string 2> to a file or memory buffer, add <string 2> to the <string 1> file or memory buffer, and store back the concatenated <string 1> and <string 2> into the data base location originally occupied by <string 1>. In doing so, the conventional data manager would generate calls to the operator routines comprising an insert (to put <string 1> into file or memory buffer) followed by an append (to add <string 2> to <string 1>) followed by another append (to put the <string 1><string 2> combination back into file or memory buffer).

In contrast, the data manager of the present invention passes the processing of the assignment statement to the LOB manager, which evaluates the assignment statement by mutating the CONCAT operator into a single append operation. That is, the LOB manager recognizes that <string 1> occurs on both sides of the assignment statement equal sign and recognizes that <string 1> can be left in place in the data base. In conjunction with the deferred evaluation scheme, the LOB manager simply appends <string 2> directly to the data base <string 1> location.

Those skilled in the art will appreciate that combinations of the substring, concatenate, and identity classes of assignment statements also can be mutated. For example, a statement of the form:

C1=[SUBSTRING (SUBSTRING (C1, 1, 50000000), 1, 25000)] CONCAT C2 is mutated into a single truncate operation on the LOB C1 (obtaining the first twenty-five thousand bytes of C1) followed by an append call using the LOB C2. It should be apparent that, in accordance with the preferred embodiment, a nested substring operation on a substring operation is mutated into a single substring operation. The mutated assignment statement is then evaluated in accordance with deferred evaluation techniques.

In addition, assignment statements that over-write data can be mutated. For example, consider an assignment statement of the form:

C1=SUBSTRING (C1, 1, 25000) CONCAT C3 CONCAT SUBSTRING (C1, 25000+length(C3), 5000000).

In accordance with the invention, an assignment statement of this form can be mutated by the LSE handler into a WRITE (C3) operation that simply overwrites C3 onto C1, thereby requiring no movement of C1 bytes. This provides even greater simplification of the assignment statement over what otherwise might be achieved.

Returning to FIG. 8, it should be appreciated that the LSE handler effectively provides performance, in the worst case, no less efficient than provided by conventional assignment statement processing routines. That is, even if none of the mutation operations represented by the flow diagram boxes numbered 142–148 can be performed, the LSE handler continues processing using conventional deferred evaluation techniques, as indicated by the continuation box numbered 150 in FIG. 8. Thus, processing times at worst will be in accordance with deferred evaluation, if none of the operators can be mutated.

Figure 9:
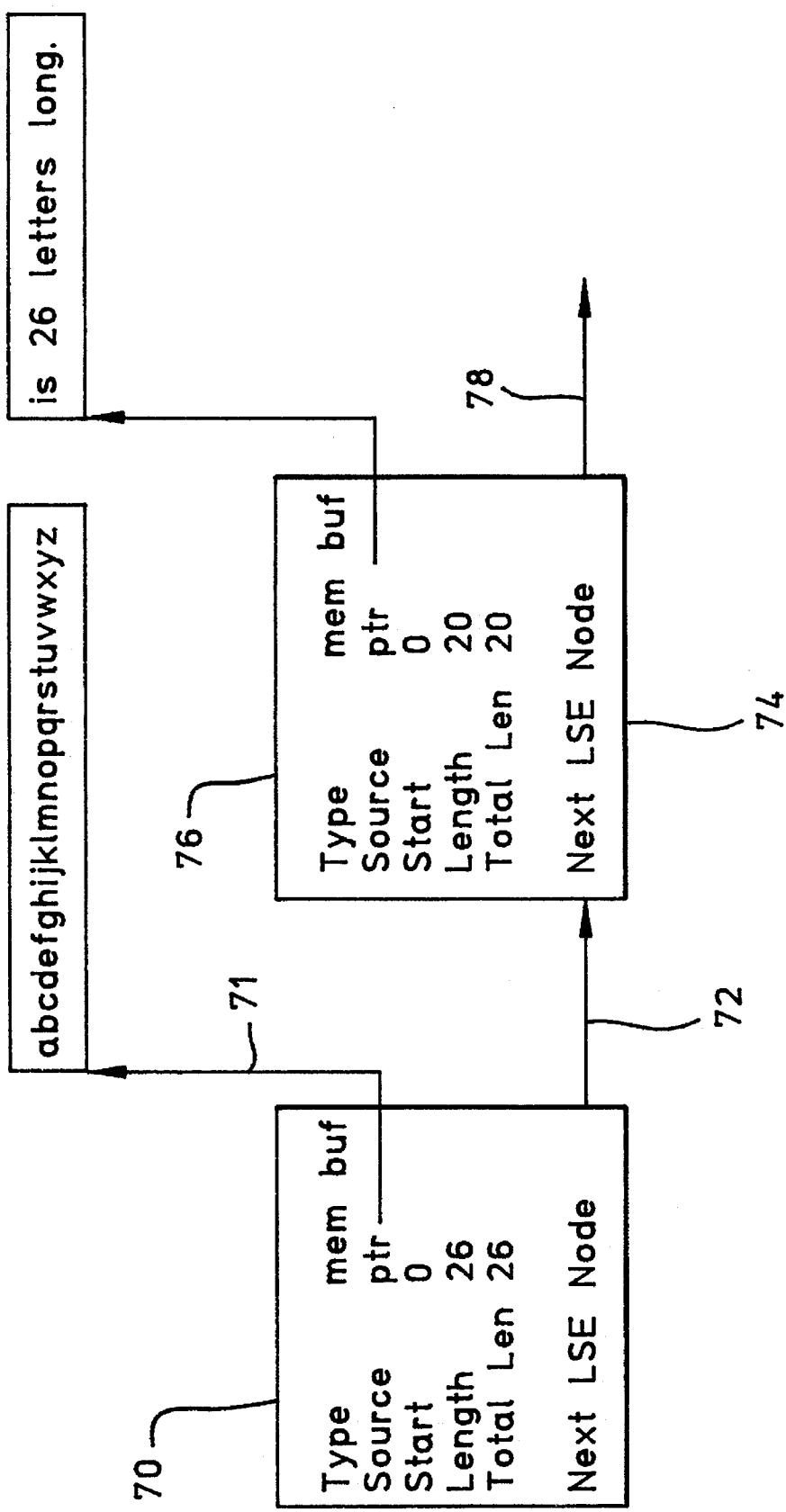
FIG. 9 is a representation of data structures such as illustrated in FIG. 8 after a concatenation operation has been performed by the LOB manager illustrated in FIG. 2.
Figure 10:
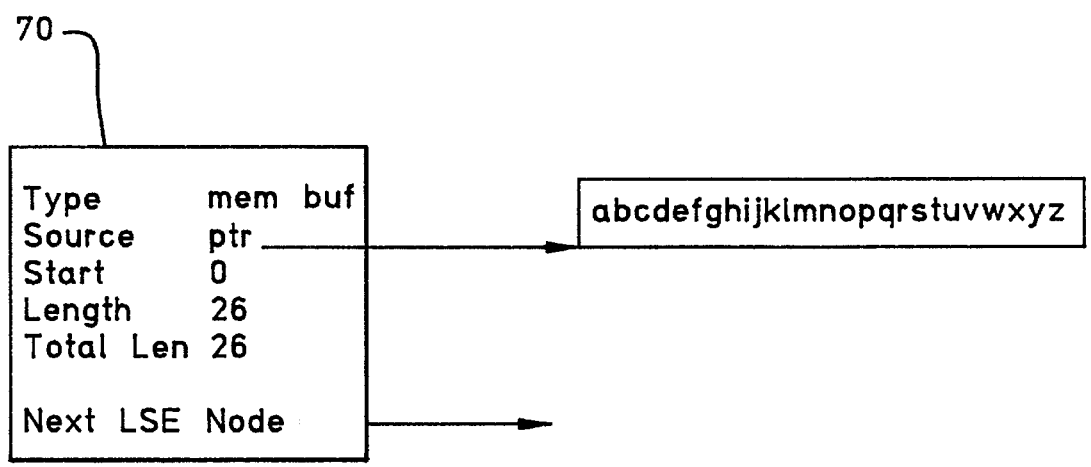
FIG. 10 and FIG. 11 are representations of data structures such as shown in FIG. 8 and illustrate the performance of a substring operation by the LOB manager shown in FIG. 2.
Figure 11:
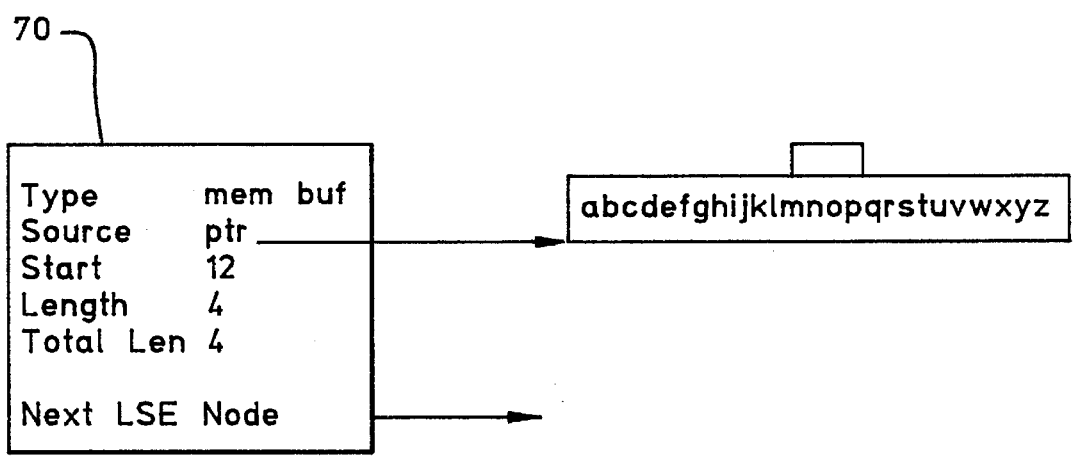

The operation of the DBMS 24 in accordance with the present invention will be better understood with reference to the following examples of the processing steps carried out by the DBMS in performing a concatenate operation (illustrated in FIG. 9) and a substring operation (illustrated in FIGS. 10 and 11).

FIG. 9 represents the LSE data structures that result from forming a concatenation operation of the form <string 1>CONCAT<string 2> where <string 1> comprises the string "ABCDEFGHIJKLMNOPQRSTUVWXYZ" and <string 2> represents the text "is 26 letters long."

In FIG. 9, the <string 1> LSE data structure 70 indicates a data type of "memory buffer" and a source corresponding to a pointer 71. Those skilled in the art will appreciate that the source being specified in the LSE data structure as a pointer ("ptr") indicates that a data address is specified for the storage location where <string 1> can be found. That is, the source pointer 72 is directed at the storage location for <string 1>. The start position in the LSE data structure is specified as zero to indicate that <string 1> begins at the first byte indicated by the pointer. The length parameter indicates that the string is twenty-six characters long, as does the total length. Finally, a pointer 72 of the LSE data structure 70 for the next LSE node 74 points to the <string 2> data structure 76.

The <string 2> LSE data structure 76 indicates a data type of "memory buffer," a source of "pointer," and again a start position of zero. It should be apparent that the length of <string 2> is twenty characters long, as indicated by the length parameter of the <string 2> LSE data structure and the total length parameter of the <string 2> LSE data structure. The <string 2> LSE pointer 78 is not connected to another data structure, to indicate that it is not associated with any other assignment statement operands. That is, the assignment statement comprises only the concatenate operation. Those skilled in the art will appreciate that carrying out the concatenate operation comprises simply changing the pointer of the <string 1> node to point to the <string 2> node. When this statement is evaluated, the LSE handler will cause the appropriate data structures to be retrieved from the data base disk, concatenated, and returned to the location specified by the left side of the assignment statement (the source LOB).

FIG. 10 is a representation of an LSE data structure to be operated on by a string operator of the form:

SUBSTRING (<source string>, start, length)

where <source string> is the first LSE data structure 70 illustrated in FIG. 9. FIG. 11 is a representation of that same data structure after a substring command of the form:

SUBSTRING (<string 1>, 12, 4)

to retrieve the group of characters beginning at the twelfth letter and extending through the fifteenth letter comprises changing the start parameter of the LSE data structure 70 from zero to twelve, changing the length from twenty-six to four, and likewise changing the total length from twenty-six to four. The result, represented in FIG. 11, is to extract the four letters "LMNO".

Thus, the computer system described above with respect to the illustrated drawings provides a relational data base management system that stores and retrieves LOBs from data base storage and mutates selected string operations on LOBs into equivalent functions that permit a LOB to be left in place in data storage, thereby reducing the number of storage access operations in evaluating an assignment statement. The system reduces storage access operations even further by employing a deferred evaluation scheme in which operands of an assignment statement being evaluated are represented by LSE data structures. If an assignment statement cannot be mutated, then the system evaluates the statement according to conventional deferred evaluation techniques. The data base management system can be embodied in a program storage device, such as a magnetic disk, on which are recorded program steps that can be read by a storage device and can cause the CPU to carry out the steps described above.

The preferred embodiment of the invention has been primarily disclosed as a computer system and method of operation thereof. In particular, it will be understood by persons of ordinary skill in the art that the computer system described above includes appropriate components (including program storage, input/output facilities, a connecting bus, and the like) and that the computer system could be programmed or otherwise designed to facilitate the practice of the method of the invention. Such a computer system would include appropriate program means for executing the method of the invention. Also, an article of manufacture, such as a pre-recorded floppy disk or other similar computer program product for use with such computer systems, could include a storage medium and program means recorded thereon (readable by an appropriate component of the computer system) for directing the computer system to facilitate the practice of the method of the invention. It will be understood that such apparatus and articles of manufacture also fall within the spirit and scope of the invention.

The present invention has been described above in terms of a presently preferred embodiment so that an understanding of the present invention can be conveyed. There are, however, many configurations for relational data base management systems not specifically described herein but with which the present invention is applicable. The present invention should therefore not be seen as limited to the particular embodiment described herein, but rather, it should be understood that the present invention has wide applicability with respect to relational data base management systems generally. All modifications, variations, or equivalent arrangements that are within the scope of the attached claims should therefore be considered to be within the scope of the invention.

We claim:

1. A method of evaluating an assignment statement received by a relational data base management system of a computer processor in a computer system from a system client, the method comprising the steps of:

receiving an assignment statement comprising at least one string operator and one operand that references a large data object (LOB) stored at a location in a data base storage device of the computer network, the assignment statement having the form of a sink operand separated from one or more source operands by an equal sign;

determining if the assignment statement contains one or more string operators and a LOB operand such that the LOB operand can remain in its data base storage device location and be operated upon by an equivalent data function that provides an identical result, thereby comprising a mutated string operator that does not require the LOB operand to be read from the data base storage device into an intermediate storage to perform the string operator;

mutating the string operator into the determined equivalent function; and processing the mutated assignment statement according to a deferred evaluation scheme.

2. A method as defined in claim 1, wherein the step of receiving an assignment statement includes replacing each operand of the assignment statement with an LSE data structure in memory of the computer processor, wherein each LSE data structure indicates a data structure type, a data structure source, a data structure start position, a data structure length, a data structure total length, and a pointer that indicates a next LSE data structure corresponding to a next operand of the assignment statement.

3. A method as defined in claim 2, wherein the step of processing the mutated assignment statement includes the steps of:

performing the equivalent functions on the LSE data structures to produce a resultant string; and deleting the LSE data structures from the computer memory after the resultant string has been produced.

4. A method as defined in claim 2, wherein the step of determining comprises the steps of:

determining whether the assignment statement includes a length-altering string operation on a first operand, beginning at a first byte of the first operand; and replacing the length-altering string operation with a truncate-in-place function on the first operand that does not require the first operand to be read from the data base storage device into the intermediate storage.

5. A method as defined in claim 4, wherein the step of mutating comprises the steps of:

mutating a concatenate operation into an append function; and mutating a substring operation into a truncate function.

6. A method as defined in claim 4, wherein the step of mutating is performed only if the operand on both sides of the equal sign of the assignment statement are the same.

7. A method as defined in claim 4, wherein the step of mutating comprises replacing a string operation with a function selected from a group including at least insert, append, delete, read, and write functions.

8. A relational data base management system for use in manipulating data objects of a computer system having a central processor unit and memory, the relational data base management system comprising:

a data manager controller that receives a relational data base assignment statement comprising at least one string operator and one operand that is stored at a location in a data base storage device of the computer system, the assignment statement having a form wherein a sink operand is separated from one or more source operands by an equal sign;

a data assignment evaluator that receives the assignment statement from the data manager controller if the assignment statement does not contain an operand that references a large data object (LOB) comprising a data object that exceeds a predetermined size and processes the assignment statement so as to perform the string operators;

a LOB manager that receives the assignment statement if it contains a LOB and determines if at least one LOB operand can remain in its respective data base storage device location and be operated upon by one or more equivalent data functions that provide an identical result as the string operator performed on the LOB, thereby comprising a mutated assignment statement that does not require the LOB operand to be read from the data base storage device into an intermediate storage; and an LSE handler that mutates the string operator determined by the LOB manager to be mutatable by replacing the string operator with the predetermined equivalent functions that operate on the LOB operand in its data base storage device location, and processes the mutated assignment statement in accordance with a deferred evaluation technique.

9. A relational data base management system as defined in claim 8, wherein the LOB manager replaces each operand of the assignment statement with an LSE data structure in memory of the computer processor, wherein the LOB manager specifies each LSE data structure so that it indicates a data structure type, a data structure source, a data structure start position, a data structure length, and a data structure total length, and also sets a pointer that indicates a next LSE data structure corresponding to a next operand of the assignment statement.

10. A relational data base management system as defined in claim 9, wherein the data assignment evaluator replaces each operand of the assignment statement with an LSE data structure in memory of the computer processor, wherein the LOB manager specifies each LSE data structure so that it indicates a data structure type, a data structure source, a data structure start position, a data structure length, and a data structure total length, and also sets a pointer that indicates a next LSE data structure corresponding to a next operand of the assignment statement.

11. A relational data base management system as defined in claim 9, wherein the LSE handler evaluates the mutated assignment statement by performing the determined equivalent functions on the LSE data structures to produce a resultant string and then deletes the LSE data structures from the computer memory after the resultant string has been produced.

12. A relational data base management system as defined in claim 11, wherein the LSE handler determines whether the assignment statement includes a length-altering string operation on a first operand, beginning at a first byte of the first operand, and in response replaces the length-altering string operation on the first operand with a truncate-in-place function that does not require the first operand to be read from the data base storage device into the intermediate storage.

13. A relational data base management system as defined in claim 12, wherein the LSE handler mutates a concatenate operation into an append function and mutates a substring operation into a truncate function.

14. A relational data base management system as defined in claim 12, wherein the LSE handler mutates the assignment statement only if the operand on both sides of the equal sign of the assignment statement are the same.

15. A relational data base management system as defined in claim 12, wherein the LSE handler replaces a string operation with a function selected from a group of data functions including at least insert, append, delete, read, and write functions.

16. A computer system comprising:

a central processor unit;

a memory;

at least one storage device that contains data objects of a relational data base;

a relational data base management system that permits a computer system user to manipulate the data objects, the relational data base management system including:

a data manager controller that receives a relational data base assignment statement from a user, the assignment statement comprising at least one string operator and one operand that is stored at a location in the data base storage device, the assignment statement having a form wherein a sink operand is separated from one or more source operands by an equal sign;

a data assignment evaluator that receives the assignment statement from the data manager controller if the assignment statement does not contain an operand that references a large data object (LOB) comprising a data object that exceeds a predetermined size and processes the assignment statement so as to perform the string operator;

a LOB manager that receives the assignment statement if it contains a LOB and determines if at least one LOB operand can remain in its respective data base storage device location and can be operated upon in-place by one or more equivalent data functions that provide an identical result as the string operator performed on the LOB, thereby comprising a mutated assignment statement that does not require the LOB operand to be read from the data base storage device into an intermediate storage location of the computer system; and an LSE handler that mutates the string operator determined by the LOB manager to be mutatable by replacing the string operator with the predetermined equivalent functions that operate on the LOB operand in its data base storage device location, and processes the mutated assignment statement in accordance with a deferred evaluation technique.

17. A computer system as defined in claim 16, wherein the LOB manager replaces each operand of the assignment statement with an LSE data structure in the memory, wherein the LOB manager specifies each LSE data structure so that it indicates a data structure type, a dam structure source, a data structure start position, a data structure length, and a data structure total length, and also sets a pointer that indicates a next LSE data structure corresponding to a next operand of the assignment statement.

18. A computer system as defined in claim 17, wherein the data assignment evaluator replaces each operand of the assignment statement with an LSE data structure in the memory, wherein the LOB manager specifies each LSE data structure so that it indicates a data structure type, a data structure source, a data structure start position, a data structure length, and a data structure total length, and also sets a pointer that indicates a next LSE data structure corresponding to a next operand of the assignment statement.

19. A computer system as defined in claim 17, wherein the LSE handler evaluates the mutated assignment statement by performing the determined equivalent functions on the LSE data structures to produce a resultant string and then deletes the LSE data structures from the computer memory after the resultant string has been produced.

20. A computer system as defined in claim 19, wherein the LSE handler determines whether the assignment statement includes a length-altering string operation on a first operand, beginning at a first byte of the first operand, and in response replaces the length-altering string operation on the first operand with a truncate-in-place function that does not require the first operand to be read from the data base storage device into the intermediate storage.

21. A computer system as defined in claim 20, wherein the LSE handler mutates a concatenate operation into an append function and mutates a substring operation into a truncate function.

22. A computer system as defined in claim 20, wherein the LSE handler mutates the assignment statement only if the operand on both sides of the equal sign of the assignment statement are the same.

23. A computer system as defined in claim 20, wherein the LSE handler replaces a string operator with a function selected from a group of data functions including at least insert, append, delete, read, and write functions.

24. A computer system as defined in claim 17, further including:

a file server connected to the central processor unit; and at least one client processor connected to the file server through which the user can communicate with the central processor unit.

25. A program storage device readable by a processor machine, tangibly embodying a program of instructions executable by the processor machine to perform method steps for permitting a user to manipulate data objects of a relational data base management system of the processor machine, the method steps performed by the processor machine comprising:

receiving an assignment statement comprising at least one string operator and one operand that references a large data object (LOB) stored at a location in a data base storage device of the processor machine, the assignment statement having the form of a sink operand separated from one or more source operands by an equal sign;

determining if the assignment statement contains one or more string operators and a LOB operand such that the LOB operand can remain in its data base storage device location and be operated upon by an equivalent data function that provides an identical result, thereby comprising a mutated string operator that does not require the LOB operand to be read from the data base storage device into an intermediate storage to perform the string operator;

mutating the string operator into the determined equivalent function; and processing the mutated assignment statement according to a deferred evaluation scheme and producing a statement result that is returned to the user of the processor machine.

26. A program storage device as defined in claim 25, wherein the step of receiving an assignment statement includes replacing each operand of the assignment statement with an LSE data structure in memory of the computer processor, wherein each LSE data structure indicates a data structure type, a data structure source, a data structure start position, a data structure length, a data structure total length, and a pointer that indicates a next LSE data structure corresponding to a next operand of the assignment statement.

27. A program storage device as defined in claim 26, wherein the step of processing the mutated assignment statement includes the steps of:

performing the equivalent functions on the LSE data structures to produce a resultant string; and deleting the LSE data structures from the computer memory after the resultant string has been produced.

28. A program storage device as defined in claim 26, wherein the step of determining comprises the steps of:

determining whether the assignment statement includes a length-altering string operation on a first operand, beginning at a first byte of the first operand; and replacing the length-altering string operation with a truncate-in-place function on the first operand that does not require the first operand to be read from the data base storage device into the intermediate storage.

29. A program storage device as defined in claim 28, wherein the step of mutating comprises the steps of:

mutating a concatenate operation into an append function; and mutating a substring operation into a truncate function.

30. A program storage device as defined in claim 28, wherein the step of mutating is performed only if the operand on both sides of the equal sign of the assignment statement are the same.

31. A program storage device as defined in claim 28, wherein the step of mutating comprises replacing a string operation with a function selected from a group including at least insert, append, delete, read, and write functions.

* * * * *

UNITED STATES PATENT AND TRADEMARK OFFICE
CERTIFICATE OF CORRECTION

PATENT NO. : 5,566,329
DATED : October 15, 1996
INVENTOR(S) : Gainer et al.

It is certified that error appears in the above-indentified patent and that said Letters Patent is hereby corrected as shown below:

Column 17, line 20, change "dam" to --data--.

Signed and Sealed this

Eighteenth Day of February, 1997

Attest:

BRUCE LEHMAN

*Attesting Officer*       *Commissioner of Patents and Trademarks*